United States Patent [19]

Smilges et al.

[11] 4,236,690
[45] Dec. 2, 1980

[54] ELECTROHYDRAULIC FLOW CONTROL APPARATUS

[75] Inventors: Robert Smilges, Paris, France; Richard Wigmore, Brighton, England

[73] Assignee: Abex Corporation, New York, N.Y.

[21] Appl. No.: 5,543

[22] Filed: Jan. 22, 1979

Related U.S. Application Data

[63] Continuation of Ser. No. 801,280, May 27, 1977.

[51] Int. Cl.³ .............................................. F16K 11/10
[52] U.S. Cl. ....................................... 251/30; 137/489
[58] Field of Search .............. 137/84, 82, 489, 625.64; 251/30, 33

[56] References Cited

U.S. PATENT DOCUMENTS

| | | | |
|---|---|---|---|
| 2,747,607 | 5/1956 | Adams | 137/489 |
| 2,896,588 | 7/1959 | Hayner | 137/625.64 X |
| 3,083,722 | 4/1963 | Dalder | 137/82 |
| 3,537,467 | 11/1970 | Marshall | 137/625.64 X |

*Primary Examiner*—Alan Cohan
*Attorney, Agent, or Firm*—Thomas S. Baker, Jr.; David A. Greenlee

[57] ABSTRACT

This invention relates to an electrically controlled flow control valve in which it is possible for the pilot fluid pressure which controls the main metering spool to build to full inlet pressure if necessary to initiate movement of the spool. An electrically operated solenoid operates a control poppet which regulates the pressure of the pilot fluid to position the metering spool.

1 Claim, 2 Drawing Figures

ELECTROHYDRAULIC FLOW CONTROL APPARATUS
===

This is a continuation of application Ser. No. 801,280, filed May 27, 1977.

BACKGROUND OF THE INVENTION
---

1. Field of the Invention

The instant invention relates to an electrohydraulic flow control valve in which the size of a metering orifice is automatically adjusted in response to the amount of current supplied to a solenoid incorporated in the device. The flow control valve can be used in conjunction with a pressure compensator, which will assure a constant pressure differential across the orifice regardless of variations in pressure upstream and downstream of the orifice, to provide a constant flow.

2. Description of the Prior Art

A simple form of flow control is a fixed orifice. A more sophisticated type of flow control is a manually adjustable, variable orifice. One type of manually adjustable, variable orifice is a needle valve.

An orifice, either fixed or adjustable, is inserted in a line and sets the area available for fluid flow. It is frequently used with a pressure compensator to provide a constant flow of fluid to a device. A pressure compensator maintains a constant fluid pressure differential across the inlet and outlet of the orifice. If the pressure drop across the orifice is uniform, the flow through the orifice is constant regardless of variations in fluid pressure upstream or downstream of the orifice.

One device which requires a constant fluid flow rate is a hydraulic motor. This enables the motor to turn at a constant speed. Another device is a hydraulic cylinder where it is necessary to provide a constant flow of fluid to enable the piston to move at a constant speed in the cylinder.

U.S. Pat. No. 3,246,669 to Adams and assigned to the assignee of the instant invention discloses a fixed orifice, pressure compensated flow control. This control uses pilot fluid for a control fluid. The control fluid is fed from the inlet port through a fixed orifice and is pressure compensated. The pressure drop across the fixed orifice is maintained constant by a control piston in which the right end of the piston is exposed to pressure upstream of the orifice and the opposite end is subjected to fluid pressure downstream of the orifice which acts in conjunction with a light spring to resist movement of the piston caused by the high pressure fluid in a well known manner. Movement of the control piston causes a land on the control piston to restrict or increase flow through a port to thereby maintain a constant flow of fluid through the orifice.

A more sophisticated flow control is shown in U.S. Pat. No. 3,200,832 to Adams and assigned to the assignee of the instant invention. This control uses an electrical device for changing the size of a metering orifice. In this control the pressure differential of pilot fluid across a variable orifice acts on a metering spool to change the size of the metering orifice. The maximum force available to move the metering spool is limited to the amount of pressure drop across the variable orifice which is typically 100 psi. This control includes a pressure compensator assembly which assures a constant pressure differential across the main metering orifice.

An electrohydraulic flow control where the pilot fluid is pressure compensated to assure a constant flow rate is also shown in U.S. Pat. No. 3,159,178 issued to Adams and assigned to the assignee of the instant invention. With a constant rate of fluid flow, the gap between the armature and the core remains the same for any selected flow rate setting and therefore the force in the poppet which controls the level of pilot pressure remains constant. If the pilot flow were not constant and the gap between the armature and core varied to accommodate different flow rates, the electro-magnetic force acting on the piston which controls the pilot pressure would not be uniform and the opening of the controlled orifice would not correspond to a given setting (either current or voltage) of the electric controller.

Another type of electrically controlled orifice can be found in a jet pipe or flapper type servo valve. In this type of valve the metering orifice spool is caused to move by the pressure differential across the ends of the spool caused by the difference of pressure between the jet pipe receiver ports. The difference in pressure in these receiver ports is a maximum of approximately 65% of the fluid inlet pressure at maximum input to the jet pipe coil.

It has been found that it is sometimes necessary to have a larger pressure differential acting across the spool which sets the size of an orifice than can be obtained from a conventional flow control using a pilot fluid or a jet pipe type of servo valve.

SUMMARY OF THE INVENTION
---

The instant invention provides an electrically operated variable orifice in which pilot fluid which operates a metering spool to set a metering orifice to a desired position can build to full inlet pressure if necessary to move the spool.

DESCRIPTION OF THE PREFERRED EMBODIMENT
---

Figure 1:
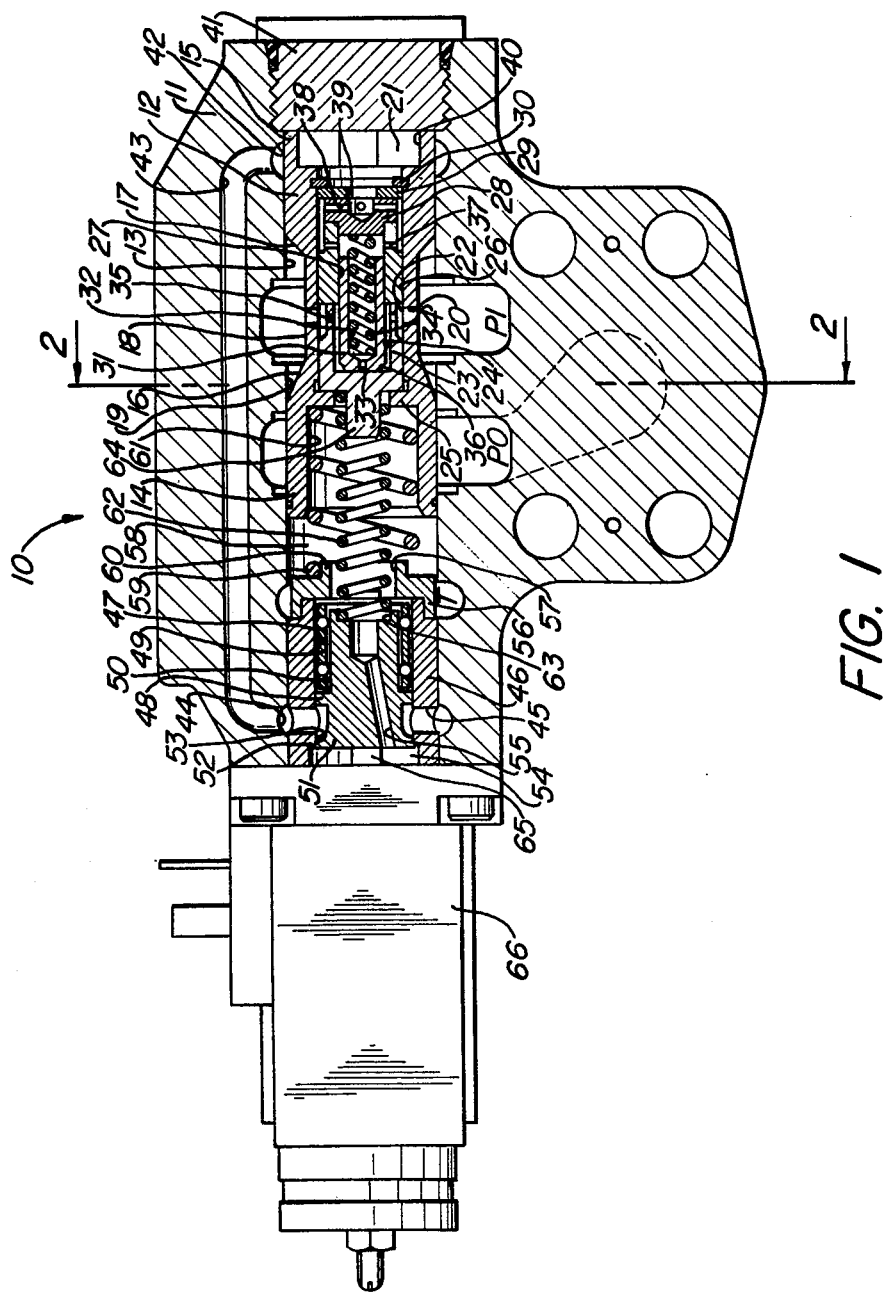
FIG. 1 is a partial cross-sectional view of the electrically controlled flow control valve.
Figure 2:
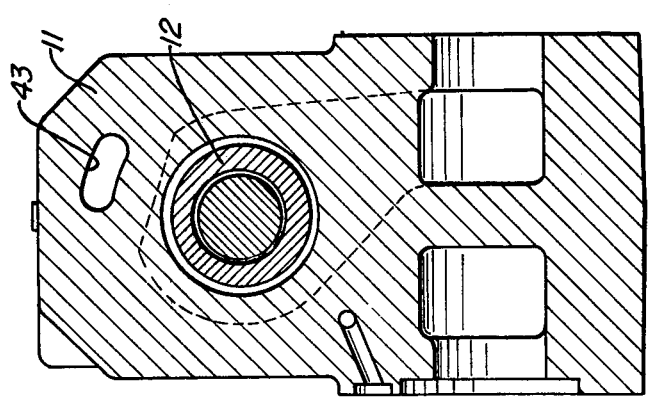
FIG. 2 is a view along lines 2—2 of FIG. 1 showing the inlet and outlet ports for the metering orifice.

Referring to FIGS. 1 and 2 of the drawings, the flow control valve 10 of the instant invention comprises a main housing 11 which contains a metering spool 12 axially movable in a longitudinal bore 13. Metering spool 12 has a pair of lands 14, 15 at opposite ends which taper along surfaces 16, 17 respectively to a reduced diameter portion 18.

Inlet port $P_I$ is connected to the outlet or exhaust port $P_O$ through land 19 in bore 13. Metering spool 12 is axially movable in bore 13 between a first extreme position in which land 14 co-operates with land 19 to seal the passage between the ports $P_I$, $P_O$, through an intermediate position in which the tapered surface 16 co-operates with land 19 to limit the flow of fluid from port $P_I$ to port $P_O$, to the second extreme position in which reduced diameter portion 18 of spool 12 co-operates with land 19 to permit maximum fluid flow from port $P_I$ to port $P_O$. The position of metering spool 12 is determined by the amount of electrical input to a solenoid as described below.

Metering spool 12 is moved by pilot fluid which enters a port 20 in metering spool 12 and flows through a small pressure compensated, fixed rate, flow control assembly which meters in approximately one quart per minute of the pilot fluid to a control chamber 21 at one end of spool 12 as will now be described. The flow control assembly provides a constant flow of pilot fluid for controlling spool 12 regardless of variation in pressure of the fluid in the inlet port $P_I$.

The internal flow control assembly is mounted in an internal, axial bore 22 in metering spool 12. The assembly includes a hub 23 which has an internal bore 24 and is bottomed in bore 22 against a lateral support 25 on spool 12. Hub 23 is secured in position by a sleeve 26 with an internal bore 27 which is sealed by an end cap 28. Hub 23, sleeve 26 and cap 28 are retained in bore 22 by a spacer 29 and a spring clip 30.

A flow control piston 31 with an internal bore 32 and a metering orifice 33 is slidably received in sleeve bore 27. A spring 34 mounted in piston bore 32 acts against end cap 28 to bias piston 31 towards the bottom surface of hub bore 24.

Fluid port 20 is aligned with another port 35 in the side wall of hub 23 to permit pilot fluid to flow into bore 24. Pilot fluid in bore 24 acts against end 36 of flow control piston 31 to move the piston 31 against spring 34 sufficiently to permit pilot fluid to flow through control orifice 33. Pilot fluid flows from the interior of piston 31 through fluid passage 37 to the outside of sleeve 26. The fluid then flows through bores 38, 39 in end cap 28 and spacer 29, respectively, to the control chamber 21 formed by enlarged internal bore 40 in metering spool 12. The pressure of the pilot fluid in chamber 21 sets the position of metering spool 12.

Bore 13 is sealed at one end by a plug 41 which sets the first extreme position of spool 12.

A fluid port 42 opens into the right end of bore 13 and receives pilot fluid from control chamber 21 when spool 12 is moved away from plug 41. Port 42 is connected through fluid passage 43 to a port 44 which opens into the left end of bore 13. Port 44 is aligned with a lateral bore 45 in a sleeve 46 which is press fitted into bore 13. Sleeve 46 has an internal bore 47.

A balanced seat control poppet 48 with ball bearings 49 mounted on its outside diameter 50 is mounted in sleeve bore 47. The function of poppet 48 is to set the pressure of the pilot fluid and thereby set the position of metering spool 12 as described below. Control poppet 48 has an enlarged end 51 with a tapered edge 52 which co-operates with a seat 53 formed by an edge on one end of sleeve 46 to provide a second variable orifice. The diameter of seat edge 53 is equal to the diameter of the sleeve bore 47 so that the effective areas are equal. Therefore, there is no net longitudinal force acting on poppet 48 from the pilot fluid.

Pilot fluid from bore 45 flows through the variable orifice to a cavity 54 at the left end of poppet 48 and into a passage 55 in the poppet 48. A hub 56 having an internal bore 57 is seated against one end of the sleeve 46. From passage 55 the pilot fluid flows through bore 57 into a cavity 58 in bore 13 between hub 56 and spool 12. Clearance is provided between hub 56 and a port T connected to tank in order to pass fluid from cavity 58.

A heavy spring 59 has one end seated around a protrusion 60 on hub 56 and the other end bottomed in an internal bore 61 in the left end of metering spool 12. The spring 59 biases spool 12 to the right against plug 41.

A light feedback spring 62 passes through internal bore 57 in hub 56 and has one end seated in a bore 63 in the right end of poppet 48 and has its other end seated around a cylindrical projection 64 on hub 23. Feedback spring 62 exerts a force on the right side of control poppet 48. The magnitude of the force is dependent upon the axial position of metering spool 12.

The poppet 48 is also acted upon by a solenoid pin 65 which engages the left side of the poppet. The amount of force exerted by pin 65 is dependent upon the current or voltage supplied to a solenoid 66 which imparts force to pin 65 in a well known manner. Therefore, a particular current or voltage input to solenoid 66 produces a force on the left side of poppet 48 which is counterbalanced by the force on the right side exerted by feedback spring 62.

In operation, assuming the control valve 10 is closed, an electrical input is supplied to the solenoid 66 dependent upon the desired position of the metering spool 12. Pilot fluid from control chamber 21 flows into the port 42, passage 43, port 44 and bore 45 to the poppet 48. Since the poppet 48 is balanced, the pilot fluid will not move the poppet. The pressure of the pilot fluid in the control chamber 21 increases until the metering spool 12 moves to the left sufficiently for feedback spring 62 to exert a force on the right side of the poppet 48 which equals the force exerted on the left side by solenoid pin 65. The pressure of the pilot fluid in chamber 21 can build as high as the pressure in the inlet port $P_I$ if it is necessary. It is sometimes necessary to reach inlet pressure in chamber 21 as when metering spool 12 is wedged in bore 13 by dirt.

When pilot fluid in control chamber 21 has moved metering spool 12 to the left to set an area of the metering orifice 16, 19, and feedback spring 62 exerts a force on poppet 48 which slightly exceeds the force on the left side of poppet 48 exerted by solenoid pin 65, the tapered edge 52 of the poppet 48 will move farther from seat 53. Increased pilot fluid will thus flow through the second variable orifice 52, 53 to tank and the pressure of the pilot fluid will stop increasing. At this time, the leftward movement of the control spool 12 will stop.

If the electrical input to the solenoid 66 is re-adjusted the force from the pin 65 on the control poppet 48 will change, which will unbalance the poppet 48 and change the size of the second variable orifice 52, 53. The pilot fluid pressure will change or shift metering spool 12 until poppet 48 is acted upon by equal forces at its opposite ends.

From the above, it can be seen that the area of the metering orifice 13, 16 is determined by the force exerted on the control poppet 48 by the solenoid pin 65, which force determines the size of the second variable orifice and the pressure of the pilot fluid. An increased force on poppet 48 by solenoid pin 65 will reduce the size of the second variable orifice 52, 53 and increase the pressure of the pilot fluid. The increased pilot fluid pressure will move the metering spool 12 to the left and enlarge the main metering orifice.

Obviously, those skilled in the art may make various changes in the details and arrangements of parts without departing from the spirit and scope of the invention as it is defined by the claims hereto appended. Applicant, therefore, wishes not to be restricted to the precise construction herein disclosed.

Having thus described and shown one embodiment of the invention, what is desired to secure by Letters Patent of the United States is:

1. A flow control valve having a metering orifice opening in proportion to an electric current comprising: a body, a fluid inlet in the body, a fluid outlet in the body, a bore in the body which connects the fluid inlet and outlet, a metering spool mounted in the bore, a land in the bore between the fluid inlet and outlet, a control surface on the spool co-operative with the land to form an orifice between the fluid inlet and outlet wherein the size of the orifice is dependent upon the relative linear position of the metering spool and land, a source of fluid under pressure in said inlet, a control chamber at one end of the metering spool passage means for providing pilot fluid from the fluid inlet to the control chamber, means for maintaining a constant rate of pilot fluid flow, said pilot fluid in the control chamber biasing the metering spool to open the orifice, means connecting the other end of the metering spool to low (tank) pressure, spring means at said other end of the metering spool opposing the force of the pilot fluid and biasing the spool to close the orifice, a second valve for controlling the pressure of the pilot fluid in the control chamber to set the position of the metering spool and the orifice size, means connecting the control chamber with the valve, wherein the second valve includes a movable control spool and a seat, said second valve forming a second variable orifice the opening of which is determined by the relative positions of the control spool and seat, a solenoid having a movable plunger tending to close the second valve, means for adjusting the force of the plunger acting on the second valve in response to an elecrical input to the solenoid, a feedback spring positioned between the metering spool and the control spool tending to open the second valve, wherein the force of the plunger sets the size of the second orifice which sets the pressure of the pilot fluid, the pilot fluid in the control chamber moves the metering spool to open the first orifice and the resulting movement of the metering spool biases the feedback spring against the valve control spool to overcome the solenoid plunger force and open the second valve to thereby limit the pressure of the pilot fluid and stop the movement of the metering spool when the force of the feedback spring on the control spool equals the force of the solenoid plunger, a stop member mounted in the bore between the metering spool and the second valve, the stop member having a second axial bore, the spring means engages said stop member and the feedback spring passes through the second axial bore without engaging the stop member.

* * * * *